United States Patent
Goldman et al.

(10) Patent No.: US 6,940,825 B2
(45) Date of Patent: Sep. 6, 2005

(54) SPANNING TREE RECOVERY IN MACHINE NETWORKS

(75) Inventors: Tomasz J. Goldman, Hellerup (DK); Claus Tondering, Lyngby (DK); Ryszard W. Dyrga, GDansk (PL)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 10/656,694

(22) Filed: Sep. 4, 2003

(65) Prior Publication Data

US 2004/0062209 A1 Apr. 1, 2004

Related U.S. Application Data

(63) Continuation of application No. 09/359,199, filed on Jul. 22, 1999, now Pat. No. 6,628,661.
(60) Provisional application No. 60/098,085, filed on Aug. 27, 1998.

(51) Int. Cl.[7] .......................... H04L 12/28; G01R 31/08
(52) U.S. Cl. ....................... 370/256; 370/408; 370/218
(58) Field of Search ................... 370/256, 254, 370/255, 216, 217, 218, 225, 241, 400, 401, 408, 390, 242, 244; 714/100, 1, 2, 3, 4

(56) References Cited

U.S. PATENT DOCUMENTS

| | | | |
|---|---|---|---|
| 5,018,133 A | 5/1991 | Tsukakoshi et al. | |
| 5,079,767 A | 1/1992 | Perlman | |
| 5,260,945 A | 11/1993 | Rodeheffer | |
| 5,280,480 A | 1/1994 | Pitt et al. | |
| 5,459,725 A | 10/1995 | Bodner et al. | |
| 5,606,669 A | 2/1997 | Bertin et al. | |
| 5,630,184 A | 5/1997 | Roper et al. | |
| 5,761,435 A | 6/1998 | Fukuda et al. | |
| 5,790,808 A | 8/1998 | Seaman | |
| 5,835,087 A | 11/1998 | Herz et al. | |
| 5,878,232 A * | 3/1999 | Marimuthu | 709/249 |
| 6,032,194 A | 2/2000 | Gai et al. | |
| 6,067,093 A | 5/2000 | Grau et al. | |
| 6,188,694 B1 * | 2/2001 | Fine et al. | 370/402 |
| 6,353,596 B1 | 3/2002 | Grossglauser et al. | |
| 6,374,311 B1 | 4/2002 | Mahany et al. | |
| 6,483,832 B1 * | 11/2002 | Civanlar et al. | 370/390 |

OTHER PUBLICATIONS

ANSI/IEEE Std. 802.1D 1993 Edition, Media Access Control (MAC) Bridges, pp. 43–100.

* cited by examiner

*Primary Examiner*—Brian Nguyen
(74) *Attorney, Agent, or Firm*—Fish & Richardson P.C.

(57) ABSTRACT

In a spanning tree-based computer network having a plurality of switches, a spanning tree can be generated and/or recovered by identifying a network core, determining a distance to the network core for each switch in the network, and generating and/or recovering a spanning tree for the network based on the switches' relative distances to the network core.

16 Claims, 4 Drawing Sheets

SPANNING TREE RECOVERY IN MACHINE NETWORKS

CROSS-REFERENCE TO RELATED APPLICATIONS

This application is a continuation (and claims the benefit of priority under 35 USC 120) of U.S. application Ser. No. 09/359,199, now U.S. Pat. No. 6,628,661, filed Jul. 22, 1999, and entitled "SPANNING TREE RECOVERY IN COMPUTER NETWORKS" which is based on United States provisional patent application Ser. No. 60/098,085, filed on Aug. 27, 1998, and entitled "RECOVERY OF A NETWORK SPANNING TREE".

BACKGROUND

This invention relates to recovering spanning trees in computer networks.

A computer network is two or more autonomous computers (or "end-stations") interconnected by communication links to facilitate the exchange of information. A Local Area Network (LAN) is a network typically implemented within a relatively small geographical area, such as with a factory or college campus. As a practical matter, each LAN has a maximum number of end-stations that it can support. If the practical upper limit of end-stations is approached or exceeded, network performance falls off dramatically. Accordingly, to enable virtually any number of end-stations to communicate with one another over a network, multiple LANs can be connected to each other with bridges (equivalently, gateways or switches).

FIG. 1 shows an example of a structure—referred to as an "extended LAN" or, equivalently, a "bridged, multiple segment LAN"—that results from interconnecting LANs. In this example, nine individual LANs (numbered 1–9) are interconnected by ten bridges (lettered A–J). As a result of the bridge interconnections, an end-station on LAN 9, for example, can communicate with end-stations on any of the other eight LANs by routing messages (e.g., communication packets or "frames") as appropriate through one or more of the Bridges A–J. Each bridge that receives a frame forwards it on to the other bridges as appropriate to deliver the message to its intended recipient.

Two basic bridging architectures exist for interconnecting LANs: "source routing" and "transparent bridging." A third bridging architecture—source routing transparent bridging—is a hybrid of the other two. Source routing transparent bridging is described in ANSI/EEEE Std. 802.1D, 1993 Edition, which is incorporated by reference.

In the source routing architecture, the specific route that a frame is to take through the network—that is, from the "source" end-station to the "destination" end-station—is carried within the frame itself. The routing information in a source routing frame must specify each step along the way from the source end-station to the destination end-station. Accordingly, prior to sending a frame, the sending end-station must have knowledge of the network topology so that a specific "source route" can be specified in the frame to be sent. This knowledge of the network topology is obtained by sending a preliminary frame known as an "explorer frame," which propagates through the network and gathers information about each network bridge and LAN through which it passes. A detailed description of the source routing architecture and related protocols is set forth in IEEE standards such as IEEE 802.1 and IEEE 802.5.

In the transparent bridging architecture, in contrast, routing information for a frame is not carried within the frame and thus need not be known to, or specified by, the source end-station prior to sending a frame. Rather, routing is determined by the destination address of a frame (i.e., the network address of the destination end-station) and by routing tables maintained at each bridge in the network. In particular, each bridge maintains a table that can include the identity of all potential destinations (end-stations) in the network. For each potential destination, a bridge's routing table identifies an associated "destination LAN"—that is, a particular one of the various LANs connected to the bridge that leads to, either directly or indirectly, the specified destination end-station.

When a bridge receives an incoming frame from one of its connected LANs (referred to as the "source LAN"), the bridge inspects the destination address in the frame and forwards the frame on to the destination LAN specified in the routing table. If, however, the destination LAN is the same as the source LAN, then the frame is discarded. On the other hand, if the destination address specified in the frame is unknown (i.e., not listed in the bridge's routing table), then the bridge forwards the frame on to all LANs to which it is connected (except for the source LAN)—a process known as "flooding."

A potential consequence of flooding is that, if each physical port in each bridge in the network is allowed to transmit and receive frames, infinite loops are likely to result. Consequently, frames will be cycled through the network perpetually and eventually will clog the network when enough accumulate.

To prevent such infinite loops, a concept known as a "spanning tree" is employed. In a spanning tree, a loop-free topology is realized by selectively designating physical ports on the bridges as either "blocking" or "forwarding. " "Forwarding" ports on a bridge are allowed to pass frames while "blocking" ports are prohibited from passing frames on to the LAN connected to the blocked port.

FIG. 2 shows an example of a spanning tree that could be used for the network of FIG. 1. The solid lines between Bridges A–J represent connections between bridge ports that are in forwarding states. These connections form part of the spanning tree for the network. The dotted lines, in contrast, represent connection between bridge ports that are in a blocking state and thus which are not part of the spanning tree for the network.

As an example of spanning tree routing, assume a frame originates at source LAN 8 and is bound for destination LAN 6. Such a frame would be routed according to the spanning tree in FIG. 2 as follows: LAN 8 to Bridge H to LAN 5 to Bridge D to LAN 2 to Bridge B to LAN 3 to Bridge E to LAN 6. Note that the otherwise shorter (lower cost) path through Bridge G is unavailable because Bridge G is not part of the spanning tree. Although in some situations, as in this example, the use of a spanning tree results in a longer path from source to destination, it nevertheless ensures a loop-free topology with connectivity between each end-station.

When a network is first installed, the spanning tree needs to be generated in the first instance. To do so, first the bridges have to choose one bridge that will serve as the root of the tree. Typically, this is accomplished by having each bridge broadcast a special packet referred to as a BPDU ("Bridge Protocol Data Unit") packet. The BPDU packet includes the bridge's serial number—or MAC (Media Access Control) address—which is installed by the bridge manufacturer and is guaranteed to be worldwide unique. Then, the bridge having the lowest MAC address is chosen as the root. Next, a spanning tree is constructed from the root to every bridge and LAN in the network based on the least cost path between each LAN, with least cost being related to bandwidth. An algorithm for generating a spanning tree is specified in the IEEE 802.1D standard (1993 ed.), which is incorporated by reference.

Under normal operating conditions, various situations may arise that require the regeneration of a spanning tree. For example, when a network is taken down for whatever reason and then brought back up, the spanning tree must be re-generated before useful network communications can occur. As another example, when a communication failure occurs after the spanning tree already has been generated (e.g., either by a bridge or a communication link failing), the bridges in the network typically will re-run the spanning tree algorithm to build a new spanning tree that reflects the changed network topology. During this re-generation of the spanning tree, which typically takes anywhere between 10 and 50 seconds to complete, no communication between LAN end-stations can occur.

SUMMARY

Various implementations of the invention may include one or more of the following features.

In general, in one aspect, a spanning tree is managed (e.g., generated and/or recovered) in a computer network by identifying a network core (e.g., a high bandwidth portion of the computer network), determining a distance to the network core for each switch in the network, and generating and/or recovering a spanning tree for the network based on the switches' relative distances to the network core. Prior to determining the switches' respective distances to the network core, the network core is identified as including one or more of the switches in the network. This identification can be based on predetermined priorities associated with switches in the computer network.

In another aspect, management of the spanning tree includes constraining an initial formulation of the spanning tree such that the spanning tree is centered at the network core. The constraints may include choosing a switch residing in the network core as the spanning tree root. Constraining the initial spanning tree formulation also may include propagating through the network information about each switch's distance to the network core, for example, by broadcasting frames periodically. Each frame can identify the broadcasting switch and a distance-to-core value.

In another aspect, management of the spanning tree includes recovering the spanning tree in response to a communication failure in the computer network. Such recovery of the spanning tree involves reconfiguring a port in a first switch to communicate with another switch closer to the network core. Reconfiguration of the first switch's port is achieved by changing the port from blocking to forwarding. As a result, recovery of the spanning tree is accomplished without executing a spanning tree generation algorithm.

In another aspect, recovery of the spanning tree includes determining whether a first switch has an operational port for communicating with another switch closer to the network core, and, if an operational port is available, reconfiguring the port to communicate with the other switch. If no operational port is available, the spanning tree generation algorithm may be executed.

In another aspect, upon detecting a spanning tree failure, a switch in a computer network recovers by reconfiguring a port to facilitate communication with another switch that is closer to a network core. The switch detects the spanning tree failure by detecting that a communication failure has occurred on a root port, for example, a port that provides a least cost path to a root of the spanning tree. Reconfiguration of the port may include switching a state of the port from blocking to forwarding.

In another aspect, a spanning tree for a computer network having a plurality of switches is generated by storing in one or more switches in the network a value representing a distance to a network core, and selecting a root for the spanning tree based on the stored distance-to-network-core values. Storage of a distance to network core value may include loading the value into a priority field of a switch ID. Selection of the spanning tree's root may include selecting as the root a switch having a lowest switch ID, or a switch having a lowest distance-to-network-core value. The distance-to-network-core information may be propagated to each switch in the network, for example, by broadcasting frames periodically, each frame identifying the broadcasting switch and a distance-to-core value.

In another aspect, a network switch residing within a computer network includes a root port in a forwarding state and at least one other port in a blocking state that is connected to another switch in the computer network. The root port can represent a least cost path to a root of a spanning tree for the computer network. The other switch in the network may be closer to the spanning tree's root. Computer software residing on a computer-readable medium accessible to the switch may include instructions to cause the network switch to perform various operations including detecting a communication failure on the root port, and changing the other port from the blocking state to a forwarding state to facilitate communication with the other switch.

The computer software further may include instructions to determine whether the other switch in the network is closer to the spanning tree's root prior to changing the state of the other port. The computer software may include instructions to initiate a spanning tree generation algorithm if the other switch in the network is not closer to the spanning tree's root.

In another aspect, a spanning tree-based computer network includes a plurality of switches one or more of which resides in a network core, and computer software residing on a computer-readable medium at each switch. The software includes instructions to cause a switch to perform various operations including generating, in cooperation with the other switches in the network, a spanning tree for the network by selecting as root one of the switches residing in the network core. In addition, the software includes instructions to cause the switch to recover from a spanning failure by connecting to another switch in the network that is closer to the network core.

The invention may provide one or more of the following advantages. By using certain spanning tree configuration parameters, information about each bridge's distance to the network's core—the portion of the network that supports the highest bandwidth—can be propagated throughout the network. As a result, each bridge in the network possesses sufficient knowledge of the network topology to be able instantaneously to reconfigure its ports as appropriate (e.g., from blocking to forwarding or vice versa) to create a modified, loop-free spanning tree.

In this manner, when a communication failure occurs a spanning tree can be recovered quickly and easily without having to re-run the spanning tree algorithm. Consequently, network communications can continue virtually uninterrupted even following a communication failure of the type that, in conventional networks, ordinarily would require the spanning tree algorithm to be re-run from scratch. Moreover, because the spanning tree algorithm need not be re-run necessarily for each communication failure experienced in the network, the waiting period during which end-stations are unable to communicate with each other essentially is eliminated.

As a consequence of requiring a system administrator to use certain spanning tree configuration parameters, the spanning tree is guaranteed to be centered at the network's core. In a core-centered spanning tree, the speed and efficiency of communications in the network are enhanced dramatically.

Other advantages will become apparent from the following description including the drawings and the claims.

DETAILED DESCRIPTION

In a network that uses transparent bridging, the switches (e.g., bridges or gateways) and communication links that reside at or near the spanning tree's root are statistically likely to handle more traffic than other non-root switches. At the same time, in a hierarchically structured network, the highest capacity bandwidth is available in the network's core or "backbone." Accordingly, in a hierarchically structured network that uses transparent bridging, centering the spanning tree at the network's core may provide significant increases in the speed and efficiency with which network traffic can be handled. This is because the higher volume of network traffic passing through or near the root is processed by the highest bandwidth resources in the network. In contrast, if the spanning tree's root was placed outside of the network's core, the same high volume of network traffic passing through or near the root would be handled by lower bandwidth resources, thus likely resulting in a bottleneck.

Figure 1:
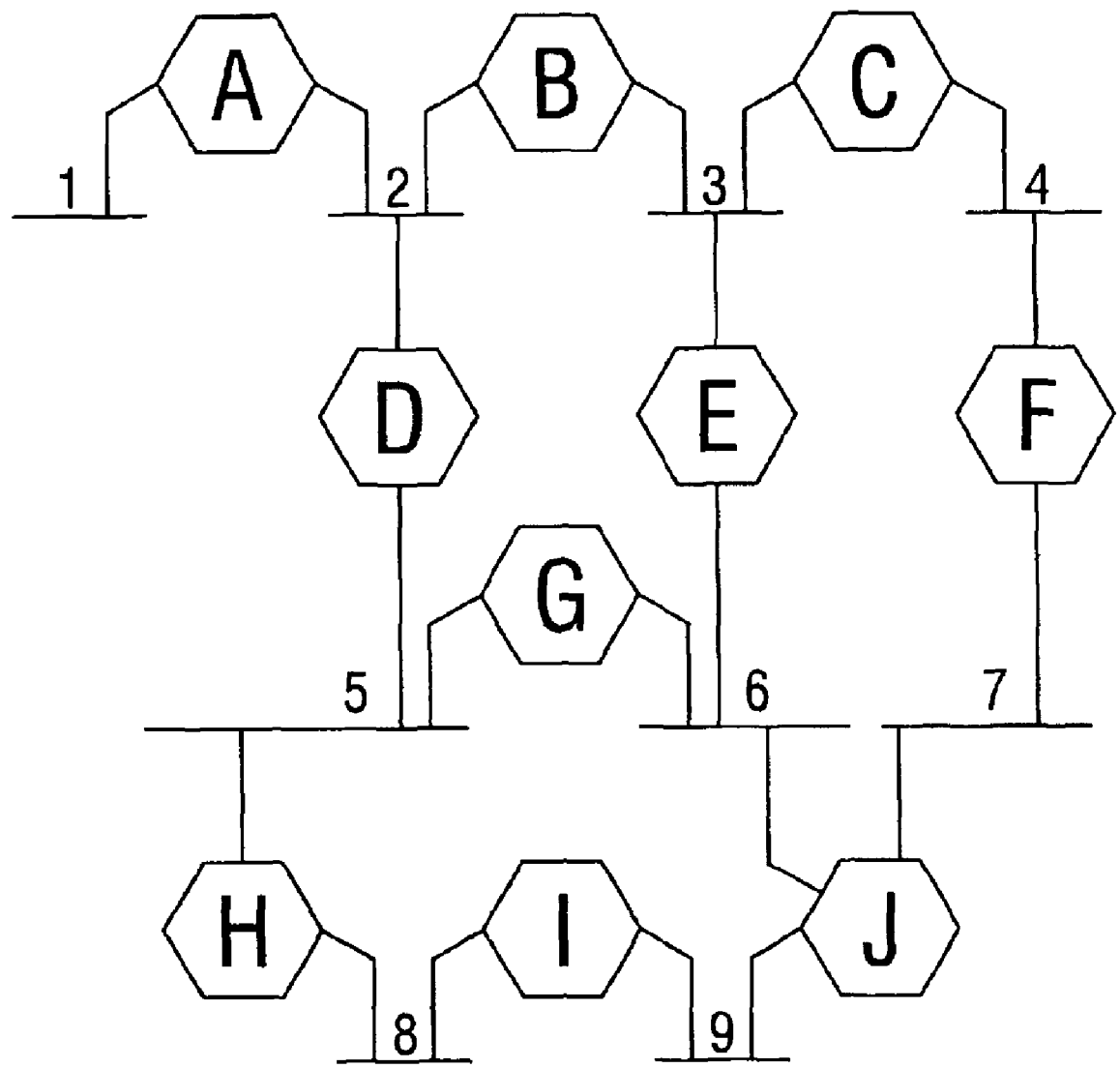
FIG. 1 shows an example of a network formed of bridges and LANs.
Figure 2:
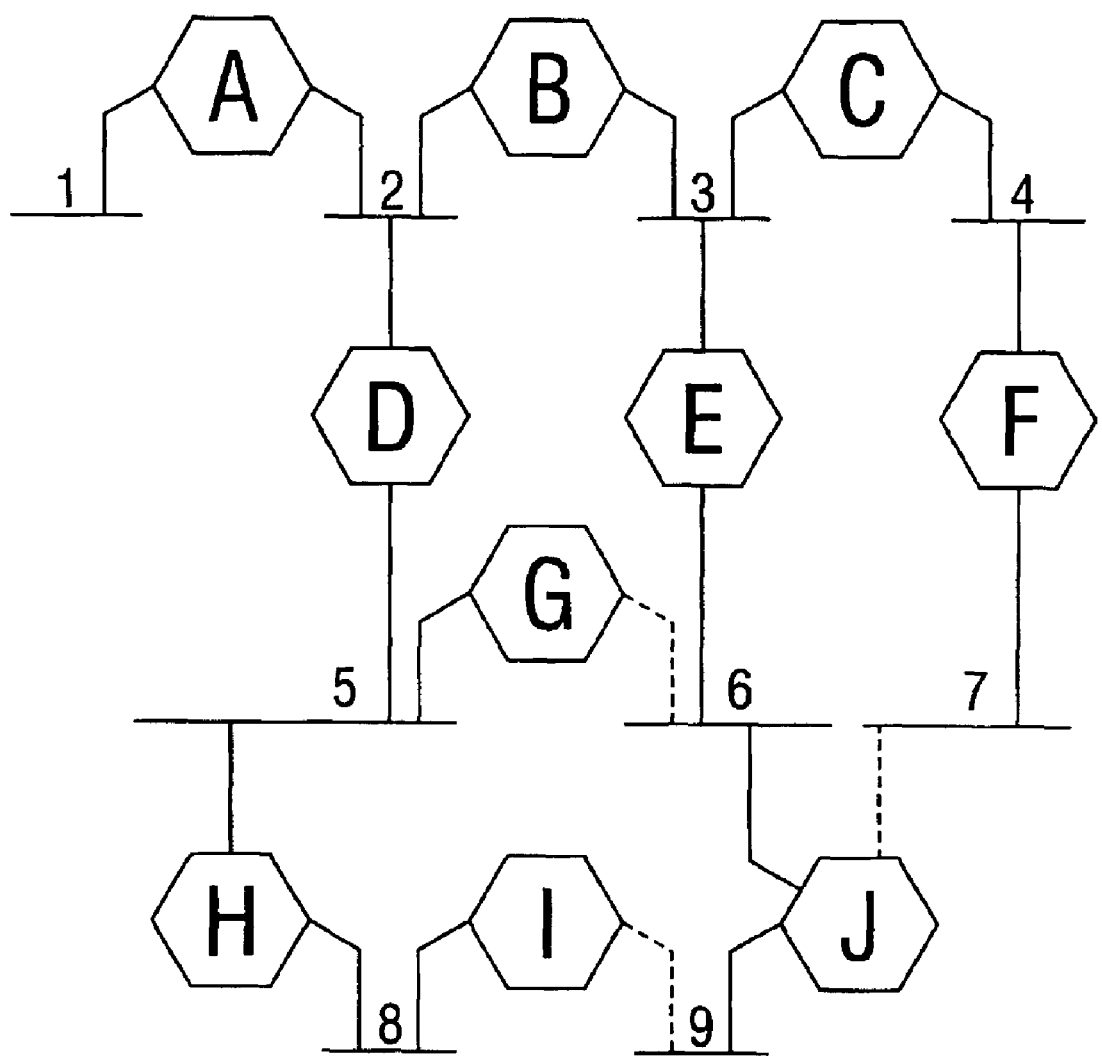
FIG. 2 shows an example of a spanning tree for the network of FIG. 1.
Figure 3:
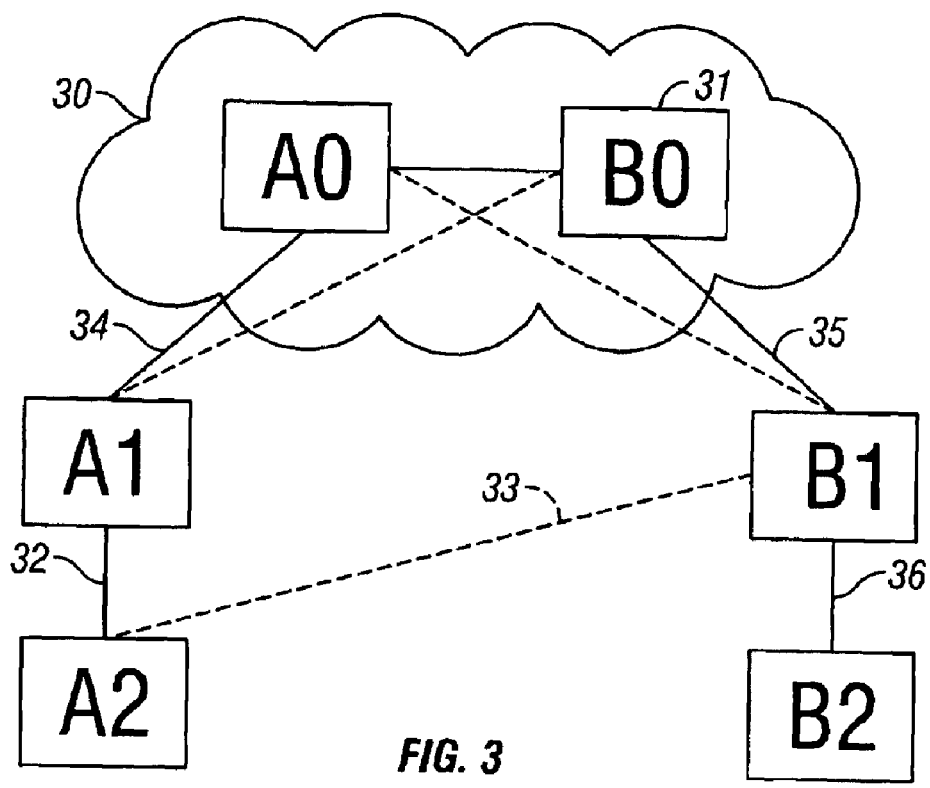
FIG. 3 shows another example of a spanning tree for a network.

An example of a network that has its spanning tree centered at the network's core is illustrated in FIG. 3. In this example, the network is formed of six interconnected switches A0, A1, A2, B0, B1, and B2. The solid lines interconnecting the switches represent the forwarding communication links in the spanning tree. The dotted-line lines represent communication links that, while physical present and potentially available for exchanging information, have been logically blocked as a result of running the spanning tree algorithm to ensure a loop-free topology. The network core 30 encompasses switches A0 and B0, with switch B0 serving as the root of the spanning tree in this example.

In the spanning tree of FIG. 3, because switches A0 and B0 are at or near the spanning tree's root, they are likely to receive more network traffic than the other switches. For example, a message sent by any of switches A0–A2 and destined for any of switches B1–B2 necessarily must pass through switch B0 as a consequence of the spanning tree topology. Accordingly, as noted above, choosing the root 31 to be a switch, such as switch B0, that resides within the network's core 30, provides a significant improvement in network performance.

But in conventional network applications of the spanning tree algorithm (e.g., as specified in IEEE 802.1D), the choice of the root tends to be arbitrary (though, in some implementations, operator configured parameters can be used to provide a degree of control over root choice). In general, the switch that happens to have the lowest MAC address will be given the highest priority and thus will be chosen as the spanning tree's root. As a result, depending on the particular network topology under consideration, the selected root may be a switch outside of the network's core and the network performance will be less than optimal.

To ensure that the spanning tree's root resides within the network's core, the root choice must be made intelligently. After a root choice has been made, a switch "distance-to-core" measurements can be computed. A switch's distance to the network core may be measured by the number of communication links that must be traversed until the core is reached. In the example spanning tree shown in FIG. 3, switches A0 and B0 each has a distance-to-core of zero (0) because, as shown, each of these switches resides in the network core 30. In contrast, switches A1, A2, B1 and B2 each has a distance-to-core greater than zero because in each case one or more communication links 32, 34, 35, and/or 36 must be traversed before the network core 30 is reached.

Figure 4:
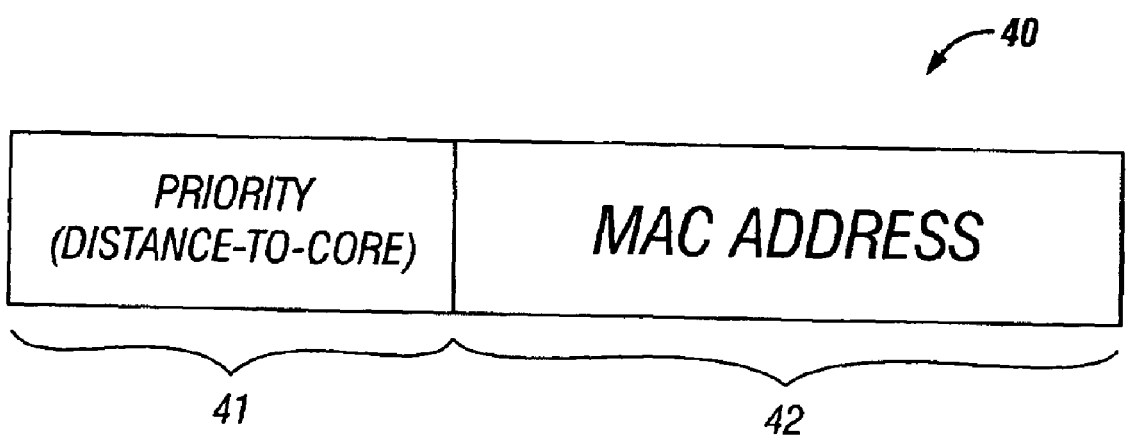
FIG. 4 shows the format of a bridge ID field.

Once determined, the distance-to-core for a switch can be stored in the switch's ID field, the format of which is shown in FIG. 4. As shown therein, a switch ID field 40 is formed of two separate sub-fields: priority 41 and MAC address 42. In conventional practice, the priority subfield 41 went unused (i.e., held the same value for every bridge in the network) and thus played no part in the choice of a spanning tree's root. Rather, in convention networks root choice was based entirely on the value of a switch's MAC address field 42, with the lowest value being chosen as root.

In the distance-to-core method, in contrast, for each switch within the core the network administrator loads the previously unused priority subfield 41 with the switch's distance-to-core—namely, zero. The priority subfields for the remaining switches outside the network's core are loaded with a value other than zero. This non-zero value can be either a switch's actual distance-to-core or simply some predetermined non-zero number that is the same for all switches outside the core.

To communicate distances-to-core among the switches in a network, and thus implement distance-to-core-based spanning tree generation, a new protocol, with an associated new type of frame, could be used. For convenience of description, this new protocol is referred to as the "heartbeat" protocol and the new frame type is referred to as "heartbeat" frames. Under the heartbeat protocol, each switch broadcasts periodically (e.g., once every second) a heartbeat frame that includes the identity of the originating switch as well as its distance-to-core.

In practice, the so-called heartbeat protocol can be implemented by modifying the BPDU protocol and exchanging BPDU packets among the switches. A description of such an implementation is set forth in detail in Appendix A, entitled "Rapid Spanning Tree Recovery" and incorporated herein by reference. A simplification of the procedure described in Appendix A follows.

After the priority subfields of the switches' respective ID fields have been loaded with the appropriate values (based on proximity to the network's core), the heartbeat protocol commences and the spanning tree generation algorithm is executed. At network initialization (or whenever the spanning tree generation algorithm is executed), each switch receives multiple heartbeat frames containing the distances-to-core of its neighbors. Unlike the conventional application of the spanning tree algorithm in which potentially any switch in the network could be chosen as the root, under the distance-to-core method only switches with a particular priority value (e.g., a zero priority value) are candidates for the choice of root. If, as shown in FIG. 3, more than one switch has a zero value distance-to-core, then those switches will have identical priority fields and the root choice necessarily is decided by which of those core switches has the lowest MAC address. In any event, the selected root is guaranteed to reside in the network core. The remainder of the spanning tree is built in the ordinary manner, for example, according to the IEEE 802.1D spanning tree algorithm, by identifying the least cost paths from the root to every switch in the network.

After an initial "settle down" period during which the various heartbeat frames are exchanged and reconciled, a switch having the lowest switch ID (i.e., the combined priority and MAC address)is selected as the tree's root. Also during this settle-down period, each switch confirms or modifies its distance-to-core to reflect its actual distance-to-core, which may or may not have changed as a result of the root choice. For example, in the network of FIG. 3, the network administrator may have set the priority subfields of switches A0, and B0 to zero and set all of the priority subfields of the remaining switches A1, B1, A2, B2 to one. In that case, either A0 or B0 would be chosen as root. Assuming B0 is chosen as root, the distance-to-core value of B0 would be propagated throughout the network and each switch would adjust its own distance-to-core relative to the root. In other words, following root choice, the spanning tree's root and the network core are treated as being coextensive even though the root in fact represents only a subset of the network core. In some implementations, the root selection algorithm may be modified to permit more than two switches to be members of the network core. The selection of a root in a two-switch core implementation is further explained in Appendix A.

Continuing the example of FIG. 3, following the choice of switch B0 as the root, switch A0 would receive heartbeat frames from switch B0 informing it of the fact that switch B0 has a distance-to-core of zero. Switch B0 then would increment this received distance-to-core value by one and store the result as its own distance-to-core. Subsequently, switch A0 would send in a heartbeat frame its newly calculated distance-to-core to switch A1, which in turn would increment the received value, store it as a new distance-to-core value and pass it on to switch A2. A similar propagation would occur in switches B1–B2.

As a result of the distance-to-core propagation process, each switch in the network knows its respective distance to the core. In addition, each switch knows which of its ports is its "root port." Specifically, the root port is the port that is both in a forwarding state and connected to switch having a lower distance-to-core. In FIG. 3, the root port for switch A1, for example, is the one connected to communication link 34.

After the root has been identified, the spanning tree has been built, and the distance-to-core information has propagated through the network, the heartbeat protocol continues to periodically propagate core distance information downstream from the core. As a result, each switch in the network will have available continuously updated state information providing (1) the identities of the switch ports that are operational (i.e., physically capable of communicating information to another switch without regard to the blocking/forwarding states), and (2) the identities of "upstream" switches (i.e., closer to the network core) to which the switch under consideration is directly connected.

In a conventional network environment, if the spanning tree fails (that is, a communication error occurs that causes a loss of connectivity between two or more switches in the network), a switch would have to re-initiate the spanning tree generation algorithm to build a new spanning tree from scratch (i.e., including root arbitration, identifying least cost paths, etc.). In contrast, the state information made available to switches through the heartbeat protocol can be used to reconfigure a switch's ports as appropriate (e.g., from blocking to forwarding or vice versa). Such reconfiguration allows the network to recover from spanning tree failure without having to rerun the spanning tree algorithm. This spanning tree recovery occurs automatically (without system administrator intervention), dynamically (on-the-fly and without disturbing network traffic) and virtually instantaneously. As a result, the network downtime following a spanning tree failure is decreased by an order of magnitude or more.

Figure 5:
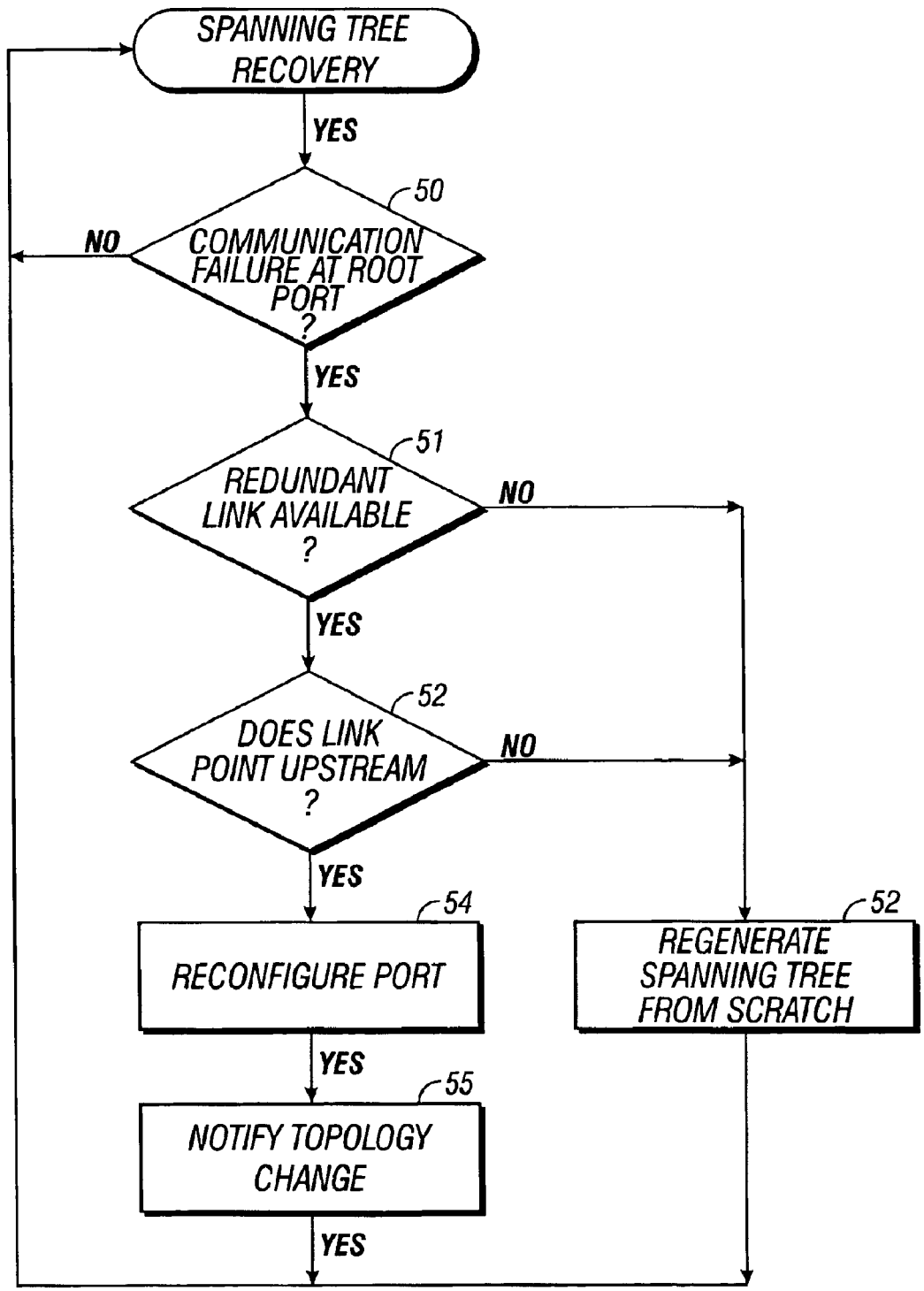
FIG. 5 is a flowchart for spanning tree recovery.

An example of spanning tree recovery that would be performed at each switch in the network is described with reference to the spanning tree of FIG. 3 and the flowchart of FIG. 5. In this example, the switch under consideration is switch A2 in FIG. 3.

First, at step 50, switch A2 determines whether a communication failure (for example, due to a failed communications link or receiving switch) has occurred at the switch's root port—that is, at the port connected to link 32.

If a failure has occurred, switch A2 determines at step 51 whether it has available any other ports, for example, redundant communication links, that are candidates for reconfiguration. If no such ports were available, at step 52 the switch would send out frames to notify other switches in the network of a topology change and that the spanning tree algorithm must be re-run to generate a new spanning tree.

But here, because switch A2 has another port available (i.e., the presently blocked port connected to link 33), at step 53 the switch determines whether that port connects to a switch that is upstream, or, equivalently, to a switch that has a smaller distance-to-core value. Again, if no such port was available at step 52 the switch would send out frames to trigger the spanning tree algorithm.

In this example, however, switch A2 knows, due to the state information obtained from heartbeat frames, that the switch connected to the blocked port—switch B1—has a distance-to-core value (two) that is one less than switch A2's distance-to-core value (three). Accordingly, at step 54 switch A2 reconfigures the port connected to switch B1 to be in a forwarding state, at which point communication link 33 becomes part of the spanning tree. Because switch A2 has changed its root port to one that connects to an upstream switch, this reconfiguration is guaranteed to recover the spanning tree's integrity and produce a topology that is loop-free and provides connectivity among all end-stations.

Next, at step 55, switch A2 broadcasts topology change notification (TCN) frames towards the root to provide notice that a topology change has occurred. This enables each switch to modify its routing table to reflect the new topology. Typically, this modification is effected by reducing (e.g., to zero)the aging time for entries in the routing table such that stale entries are purged following lapse of the aging time, and the routing table is re-built with information reflective of the recovered, modified spanning tree.

The techniques, methods and systems described here may find applicability in any computing, processing, or communications network environment. For example, these techniques, methods and systems may find applicability in either a transparent bridging architecture or a source routing transparent bridging architecture.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention advantageously may be implemented in one or more computer programs that are executable on a programmable system including at least one programmable processor coupled to receive data and instructions from, and to transmit data and instructions to, a data storage system, and suitable input and output devices. Each computer program may be implemented in a high-level procedural, or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Other embodiments are within the scope of the following claims.

What is claimed is:

1. A network switch comprising:

two or more ports; and a machine-readable medium embodying information indicative of instructions that when performed by the network switch result in operations comprising:

storing a value representing a determined distance to a network core for the network switch, wherein the network core represents a high bandwidth portion of a network and comprises multiple core switches having a distance to network core of zero;

configuring one of the two or more ports as a root port, in a forwarding state, that represents a least cost path to a root switch and another of the two or more ports in a blocking state, the root switch having been selected for a spanning tree for the network to center the spanning tree at the network core, the spanning tree being formed in part by said configuring; and recovering the spanning tree, in response to a communication failure, based on periodically propagated network core distance information stored in the network switch.

2. The network switch of claim 1, wherein the periodically propagated network core distance information comprises information indicating a distance to the root switch from the network switch.

3. The network switch of claim 1, wherein the recovering the spanning tree comprises:

determining whether the blocked port is operationally connected to a second switch and whether the second switch is closer to the root switch than the network switch by checking the periodically propagated network core distance information stored in the network switch;

changing the blocked port to a forwarding state if the blocked port is operationally connected to the second switch that is closer to the root switch than the network switch, and initiating regeneration of the spanning tree if the blocked port is not operationally connected to the second switch that is closer to the root switch than the network switch.

4. The network switch of claim 1, wherein the operations further comprise, periodically:

receiving one or more frames that each identify an upstream broadcasting switch and a first distance to network core value;

storing information identifying one or more switch ports that are operational and one or more directly-connected upstream switches; and broadcasting one or more frames that each identify the network switch and a second distance to network core value.

5. A system comprising:

a plurality of switches including core switches that reside in a network core representing a high bandwidth portion of a network, each of the core switches having a distance to network core of zero; and machine-readable media embodying information indicative of instructions that when performed by the plurality of switches result in operations comprising:

generating a spanning tree for the network by selecting one of the core switches to be a root switch of the spanning tree; and recovering the spanning tree in response to a communication failure based on periodically propagated network core distance information stored in at least a first switch of the plurality of switches.

6. The system of claim 5, wherein the periodically propagated network core distance information comprises information indicating a distance to the root switch.

7. The system of claim 5, wherein the recovering the spanning tree comprises:

determining whether a blocked port at the first switch is operationally connected to a second switch of the plurality of switches and whether the second switch is closer to the root switch than the first switch by checking the periodically propagated network core distance information stored in the first switch;

changing the blocked port to a forwarding state if the blocked port is operationally connected to the second switch that is closer to the root switch than the first switch; and initiating regeneration of the spanning tree if the blocked port is not operationally connected to the second switch that is closer to the root switch than the first switch.

8. The system of claim 5, wherein the operations further comprise:

periodically propagating the network core distance information downstream by broadcasting frames periodically, each frame identifying a broadcasting switch and a distance to network core value; and updating downstream switches with the network core distance information by storing at each of the downstream switches information identifying one or more switch ports that are operational and one or more directly-connected upstream switches.

9. A method comprising:

storing a value representing a determined distance to a network core for a network switch, wherein the network core represents a high bandwidth portion of a network and comprises multiple core switches having a distance to network core of zero;

configuring a first port of the network switch as a root port, in a forwarding state, that represents a least cost path to a root switch and a second port of the network switch in a blocking state, the root switch having been selected for a spanning tree for the network to center the spanning tree at the network core, the spanning tree being formed in part by said configuring; and recovering the spanning tree, in response to a communication failure, based on periodically propagated network core distance information stored in the network switch.

10. The method of claim 9, wherein the periodically propagated network core distance information comprises information indicating a distance to the root switch from the network switch.

11. The method of claim 9, wherein the recovering the spanning tree comprises:

determining whether the blocked port is operationally connected to a second switch and whether the second switch is closer to the root switch than the network switch by checking the periodically propagated network core distance information stored in the network switch;

changing the blocked port to a forwarding state if the blocked port is operationally connected to the second switch that is closer to the root switch than the network switch; and initiating regeneration of the spanning tree if the blocked port is not operationally connected to the second switch that is closer to the root switch than the network switch.

12. The method of claim 9, further comprising, periodically:

receiving one or more frames that each identify an upstream broadcasting switch and a first distance to network core value;

storing information identifying one or more switch ports that are operational and one or more directly-connected upstream switches; and broadcasting one or more frames that each identify the network switch and a second distance to network core value.

13. An article comprising a machine-readable medium embodying information indicative of instructions that when performed by one or more machines result in operations comprising:

storing a value representing a determined distance to a network core for a network switch, wherein the network core represents a high bandwidth portion of a network and comprises multiple core switches having a distance to network core of zero;

configuring a first port of the network switch as a root port in a forwarding state that represents a least cost path to a root switch and a second port of the network switch in a blocking state, the root switch having been selected for a spanning tree for the network to center the spanning tree at the network core, the spanning tree being formed in part by said configuring; and recovering the spanning tree, in response to a communication failure, based on periodically propagated network core distance information stored in the network switch.

14. The article of claim 13, wherein the periodically propagated network core distance information comprises information indicating a distance to the root switch from the network switch.

15. The article of claim 13, wherein the recovering the spanning tree comprises:

determining whether the blocked port is operationally connected to a second switch and whether the second switch is closer to the root switch than the network switch by checking the periodically propagated network core distance information stored in the network switch;

changing the blocked port to a forwarding state if the blocked port is operationally connected to the second switch that is closer to the root switch than the network switch; and initiating regeneration of the spanning tree if the blocked port is not operationally connected to the second switch that is closer to the root switch than the network switch.

16. The article of claim 13, wherein the operations further comprise, periodically:

receiving one or more frames that each identify an upstream broadcasting switch and a first distance to network core value;

storing information identifying one or more switch ports that are operational and one or more directly-connected upstream switches; and broadcasting one or more frames that each identify the network switch and a second distance to network core value.

* * * * *